United States Patent
Tiwari et al.

(10) Patent No.: US 11,860,649 B2
(45) Date of Patent: Jan. 2, 2024

(54) METHOD FOR MONITORING TEMPERATURE-CONTROLLED UNITS IN A STORE

(71) Applicant: Simbe Robotics, Inc., San Francisco, CA (US)

(72) Inventors: Durgesh Tiwari, San Francisco, CA (US); Bradley Bogolea, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 960 days.

(21) Appl. No.: 16/823,254

(22) Filed: Mar. 18, 2020

(65) Prior Publication Data

US 2020/0218296 A1 Jul. 9, 2020

Related U.S. Application Data

(63) Continuation of application No. 16/245,135, filed on Jan. 10, 2019, now Pat. No. 10,642,293.

(60) Provisional application No. 62/615,809, filed on Jan. 10, 2018.

(51) Int. Cl.
| | |
|---|---|
| G05D 23/275 | (2006.01) |
| G06T 7/50 | (2017.01) |
| G01N 21/25 | (2006.01) |
| G06T 7/00 | (2017.01) |

(52) U.S. Cl.
CPC ..... *G05D 23/27543* (2013.01); *G01N 21/255* (2013.01); *G06T 7/0004* (2013.01); *G06T 7/50* (2017.01); *G06T 2207/10024* (2013.01); *G06T 2207/10028* (2013.01); *G06T 2207/30128* (2013.01)

(58) Field of Classification Search
CPC ... G05D 23/27543; G06T 7/50; G06T 7/0004; G06T 2207/10024; G06T 2207/10028; G06T 2207/30128; G01N 21/255
See application file for complete search history.

(56) References Cited

U.S. PATENT DOCUMENTS

| | | | | |
|---|---|---|---|---|
| 2015/0290795 | A1* | 10/2015 | Oleynik | B25J 9/0081 700/257 |
| 2017/0147971 | A1* | 5/2017 | Morse | G06F 16/70 |
| 2017/0321948 | A1* | 11/2017 | Vitel | F25D 11/003 |
| 2017/0370637 | A1* | 12/2017 | Manning | F25D 29/00 |

* cited by examiner

*Primary Examiner* — Brian W Jennison
(74) *Attorney, Agent, or Firm* — Run8 Patent Group, LLC; Peter Miller

(57) ABSTRACT

One variation of a method for monitoring cooling units in a store includes: at a robotic system, during a first scan routine, autonomously navigating toward a cooling unit in the store, recording a color image of the cooling unit, and scanning a set of temperatures within the cooling unit; identifying a set of products stocked in the cooling unit based on features detected in the color image; mapping the set of temperatures to the set of products at a first time during the first scan routine based on positions of products in the set of products identified in the color image; and generating a record of temperatures of the set of products stocked in the cooling unit at the first time.

21 Claims, 3 Drawing Sheets

METHOD FOR MONITORING TEMPERATURE-CONTROLLED UNITS IN A STORE

CROSS-REFERENCE TO RELATED APPLICATIONS

This application is a continuation application of U.S. patent application Ser. No. 14/245,135, filed on 10 Jan. 2019, which claims the benefit of U.S. Provisional Patent Application No. 62/615,809, filed on 10 Jan. 2018, which is incorporated in its entirety by this reference.

This application is related to U.S. patent application Ser. No. 15/600,527, filed on 19 May 2017, and to U.S. patent application Ser. No. 15/347,689, filed on 9 Nov. 2016, each of which is incorporated in its entirety by this reference.

TECHNICAL FIELD

This invention relates generally to the field of inventory management and more specifically to a new and useful method for monitoring temperature-controlled units in a store in the field of inventory management.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
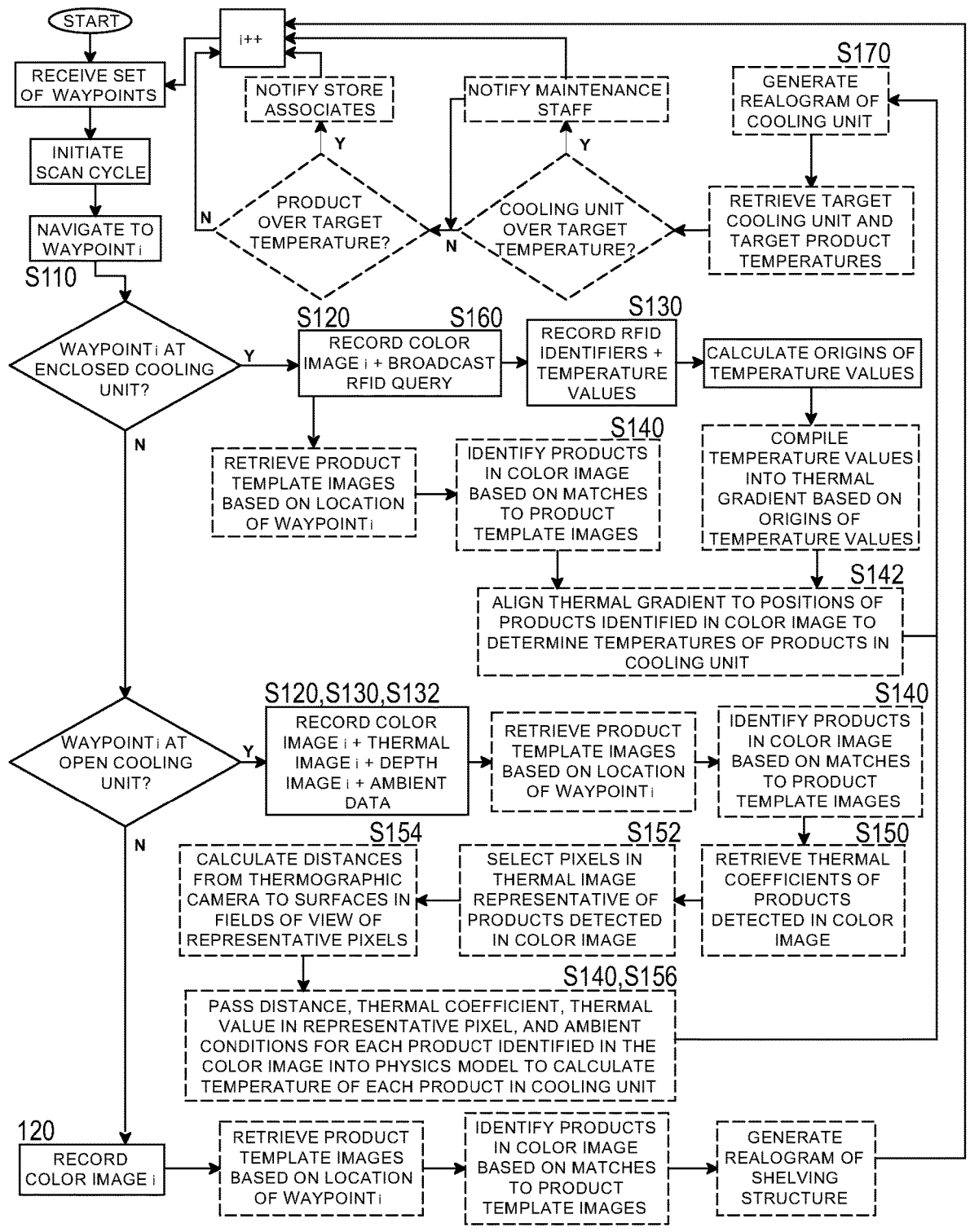
FIG. 1 is a flowchart representation of a method.

As shown in FIG. 1, a method S100 for monitoring temperature-controlled units in a store includes, at a robotic system, during a first scan routine: autonomously navigating toward a cooling unit in the store in Block S110; recording a color image of the cooling unit in Block S120; and scanning a set of temperatures within the cooling unit in Block S130. The method S100 also includes: identifying a set of products stocked in the cooling unit based on features detected in the color image in Block S140; mapping the set of temperatures to the set of products at a first time during the first scan routine based on positions of products in the set of products identified in the color image in Block S142; and generating a record of temperatures of the set of products stocked in the cooling unit at the first time in Block S170.

One variation of the method S100 includes, at the robotic system, during a first scan routine: autonomously navigating toward a temperature-controlled unit in the store in Block S110; and recording a color image and a thermal image of the temperature-controlled unit in Block S120. This variation of the method S100 also includes: identifying a set of products stocked in the temperature-controlled unit based on features detected in the color image in Block S140; for each product in the set of products stocked in the temperature-controlled unit, retrieving a stored emissivity of a surface of the product from a database based on an identity of the first product in Block S150, selecting a thermal pixel in the thermal image depicting the product in Block S130, and, calculating a temperature of the product at the first time based on a thermal value stored in the thermal pixel and the emissivity of the surface of the product in Block S148; and generating a record of temperatures of products, in the set of products, at the first time in Block S170. In this variation, the method S100 can further include: at the robotic system during the first scan routine, recording a depth image of the open cooling unit in Block S132 and recording an ambient temperature, an ambient humidity, and an ambient light level proximal the robotic system in Block S132; and, for each product in the set of products, calculating a distance from the robotic system to the product based on the depth image in Block S154 and passing the emissivity of the surface of the product, the thermal value stored in the thermal pixel, the distance, the ambient temperature, the ambient humidity, and the ambient light level into a physics model to calculate the temperature of the product at the first time in Block S156.

Another variation of the method S100 includes: at a robotic system, during a first scan routine: autonomously navigating toward a temperature-controlled unit in the store in Block S110; recording a color image of the temperature-controlled unit in Block S120; and broadcasting a query for temperature values from a set of temperature-enabled transmitters coupled to the temperature-controlled unit in Block S160; and recording a set of temperature values transmitted by the set of temperature-enabled transmitters in Block S130. This variation of the method S100 also includes: identifying a set of products stocked in the temperature-controlled unit based on features detected in the color image in Block S140; accessing locations of the set of temperature-enabled transmitters coupled to the temperature-controlled unit; mapping the set of temperature values received from the set of temperature-enabled transmitters to the set of products at the first time in Block S142 based on locations of the set of temperature-enabled transmitters in the temperature-controlled unit and locations of the set of products identified in the color image; and generating a record of temperatures of the set of products stocked in the temperature-controlled unit at the first time in Block S170.

2. Applications

Generally, the method S100 can be executed by a robotic system and by a computer system (hereinafter the "system"): to autonomously collect product identification, temperature, humidity, and/or other relevant data from temperature-controlled units (e.g., open refrigerators, enclosed refrigerators, freezers, heated and cooled food displays, etc.) within a facility (e.g., a grocery store); and to transform these data into temperatures of specific products stocked in these temperature-controlled units, temperatures of product slots in these temperature-controlled units, and/or temperatures of these temperature-controlled units more generally. Based on derived temperatures of such products, the system can selectively alert associates of the facility to remove and discard specific products that have been exposed to temperatures outside of predefined temperature ranges. Similarly, based on derived temperatures of product slots, the system can selectively prompt associates of the facility to move specific products to different product slots better suited to assigned temperature storage ranges of these products. Furthermore, based on derived temperatures of such temperature-controlled units (e.g., average temperature, temperature gradient, spatial or temporal temperature variance), the system can selectively alert associates of the facility when these temperature-controlled units are malfunctioning or set at incorrect temperatures for products stocked in these units.

In particular, temperatures of temperature-controlled units and products stored therein may be audited manually by associates of a store. However, such audits may be time-consuming and therefore performed intermittently or rarely such that detection of malfunctioning temperature-controlled units is significantly delayed such as by hours or by days and only following a customer complaint. Intermittent temperature data of these temperature-controlled units may further yield uncertainty regarding both when a temperature-controlled unit began to malfunction and actual temperature exposures of products stored in this temperature-controlled unit. Therefore, to compensate for greater risk of food spoilage given such temperature exposure uncertainty, the store may discard the entire contents of the malfunctioning temperature-controlled unit.

2.1 Open Temperature-Controlled Units

Conversely, a robotic system deployed in the store can execute Blocks of the method S100 to: autonomously navigate throughout the store (e.g., dynamically based on patron traffic or along a predefined sequence of waypoints); and record temperature data of temperature-controlled units at known locations throughout the store. For example, at each waypoint associated with an open temperature-controlled unit (e.g., an open refrigerator) within the store, the robotic system can: orient toward the adjacent temperature-controlled unit; record a thermal image, a color image, and/or a depth image of the temperature-controlled unit through a thermographic camera, a color camera, a depth sensor integrated into the robotic system; record local ambient data via other sensors integrated into the robotic system; and upload these data to a remote computer system via a wireless local area network. The remote computer system can then: implement methods and techniques described in U.S. patent application Ser. No. 15/600,527—which is incorporated in its entirety by this reference—to identify products in the temperature-controlled unit based on features extracted from the color image; retrieve known thermal coefficients for these products (e.g., average thermal emissivity values of product packaging of these products); and then calculate corrected temperatures of these products based on thermal values stored in pixels in the thermal image depicting these products identified in the color image, thermal coefficients of these products, local ambient data, and distances between the robotic system (e.g., the thermographic camera) and these products. Additionally or alternatively, the remote computer system can implement similar methods and techniques to calculate corrected temperatures of reference surfaces in the temperature-controlled unit, such as faces of shelves supporting these products. The robotic system and remote computer system can repeat this process for each other open temperature-controlled unit in the store, record these temperature data in a database or other memory format, and then selectively serve prompts or notifications to associates of the store, maintenance staff, etc. based on these temperature data.

2.2 Enclosed Temperature-Controlled Units

Additionally or alternatively, open and/or enclosed cooling units (e.g., refrigerators and freezers with sealed doors) throughout the store can be outfitted with temperature-enabled transmitters (e.g., temperature-enabled RFID or NFC tags) configured to broadcast unique electronic identifiers and temperature values when excited by a power signal broadcast by a reader integrated into the robotic system. When occupying a location (e.g., a predefined waypoint) adjacent a temperature-controlled unit outfitted with such temperature-enabled transmitters, the robotic system can: record a color image of the temperature-enabled unit; broadcast an excitation signal toward the temperature-controlled unit; record unique electronic identifier and temperature value pairs returned by temperature-enabled transmitters nearby; and upload the color image and unique electronic identifier and temperature value pairs to the remote computer system. The remote computer system can then: reference a lookup table or other database linking these unique electronic identifiers to specific cooling units or cooling unit locations throughout the store; derive positions of these temperature-enabled transmitters based on positions and orientations of the robotic system and characteristics of signals received from these temperature-enabled transmitters; or visually detect these temperature-enabled transmitters (e.g., constellations of unique optical features linked to unique identifies broadcast by corresponding temperature-enabled transmitters) in the color image. The remote computer system can then interpolate temperatures of products and/or reference surfaces on the temperature-controlled unit—detected in the color image—based on temperature values received from these temperature-enabled transmitters and known or derived positions of these temperature-enabled transmitters. The remote computer system can repeat this process for other open or enclosed temperature-controlled units outfitted with such temperature-enabled transmitters throughout the store in order to monitor temperatures of products stocked in these temperature-controlled units.

2.3 Temperature Data Aggregation and Prompts

By regularly executing Blocks of the method S100 to record temperature data of temperature-controlled units throughout the store and temperature data of product stocked therein—such as each time the robotic system passes a temperature-controlled unit during daily inventory tracking routines or hourly temperature monitoring routines (generally "scan routines")—the robotic system can amass a timeseries of temperature-controlled unit and product temperatures over time. Based on these temperature data, the remote computer system can rapidly detect abnormal mean temperatures, temperature variances, or temperature gradients, etc. in temperature-controlled units throughout the store and then prompt store associates to inspect, adjust, or repair these temperature-controlled units accordingly, which may enable these store associates to address an incorrect temperature setting or malfunction at a temperature-controlled unit before products stored in the malfunctioning unit spoil or are otherwise exposed to temperatures outside of a required bound.

The remote computer system can also detect temperature-related trends in temperature-controlled units in the store, predict probability of future failure of a particular temperature-controlled unit based on a temperature-related trend of the particular temperature-controlled unit (e.g., a trend in temperature versus power consumption, temperature variance, mean temperature change over time), and then issue a prompt to store associates to preemptively inspect, repair, or replace the particular unit, thereby enabling store associates to preemptively address future temperature-controlled unit failures.

Furthermore, by generating and storing this timeseries of temperature data of temperature-controlled units, product slots, and/or individual products in temperature-controlled units throughout the store, the remote computer system can maintain a log of temperature exposures of perishable goods stocked throughout the store and sold by the store over time, thereby: enabling the store (or a disease prevention authority or other external regulatory entity) to determine—with greater confidence—whether spoilage of a particular perishable good occurred due to temperature exposure at the store or due to exposure or other factor outside of the store; and enabling the store to systematically address such temperature-related errors.

Therefore, the robotic system can regularly collect temperature data of temperature-controlled units throughout a store, such as systematically multiple times per day during inventory tracking routines and/or dedicated temperature monitoring routines. The remote computer system (or the robotic system) can process these data in near real-time to rapidly or preemptively detect a malfunctioning temperature-controlled unit and to inform associates of the store accordingly. The remote computer system can also maintain temperature logs of temperature-controlled units, product slots, or specific products throughout the store over time (e.g., multiple temperature recordings per day for each temperature-controlled unit over a period of six months) in order to provide longer-term insight into temperature exposure of perishable goods stocked in these temperature-controlled units sold by the store.

The method S100 is described below as executed by the robotic system—deployed in a grocery store—and by the remote computer system to monitor cooling units arranged in a grocery store, to track temperatures of products stocked in these cooling units over time, and to selectively serve prompts related to temperatures of these products and function of these cooling units. However, the robotic system and the remote computer system can implement similar methods and techniques to monitor food bars, heated cabinets, heated displays, and/or temperature-controlled units of other types located within a grocery store, cafeteria, restaurant, or other type of facility.

Furthermore, the method S100 is described herein as including: Blocks executed locally by the robotic system to collect stock- and temperature-related data throughout a store; and Blocks executed remotely by a remote computer system (e.g., a remote server, a computer network, a computer system within the store and remote or separate from the robotic system). However, Blocks of the method S100 can be executed by one or more robotic systems placed in a store (or warehouse, etc.), by a local or remote computer system, and/or by any other computer system. For example, the robotic system can also upload scan data (e.g., thermal images, depth maps, color images) to a remote computer system—such as over a cellular network or local area network—for remote processing and by the remote computer system. However, the robotic system can additionally or alternatively execute Blocks of the method S100 to locally process stock- and temperature-related data, such as in real-time during an inventory tracking routine or dedicated temperature monitoring routine.

3. Robotic System

Figure 2:
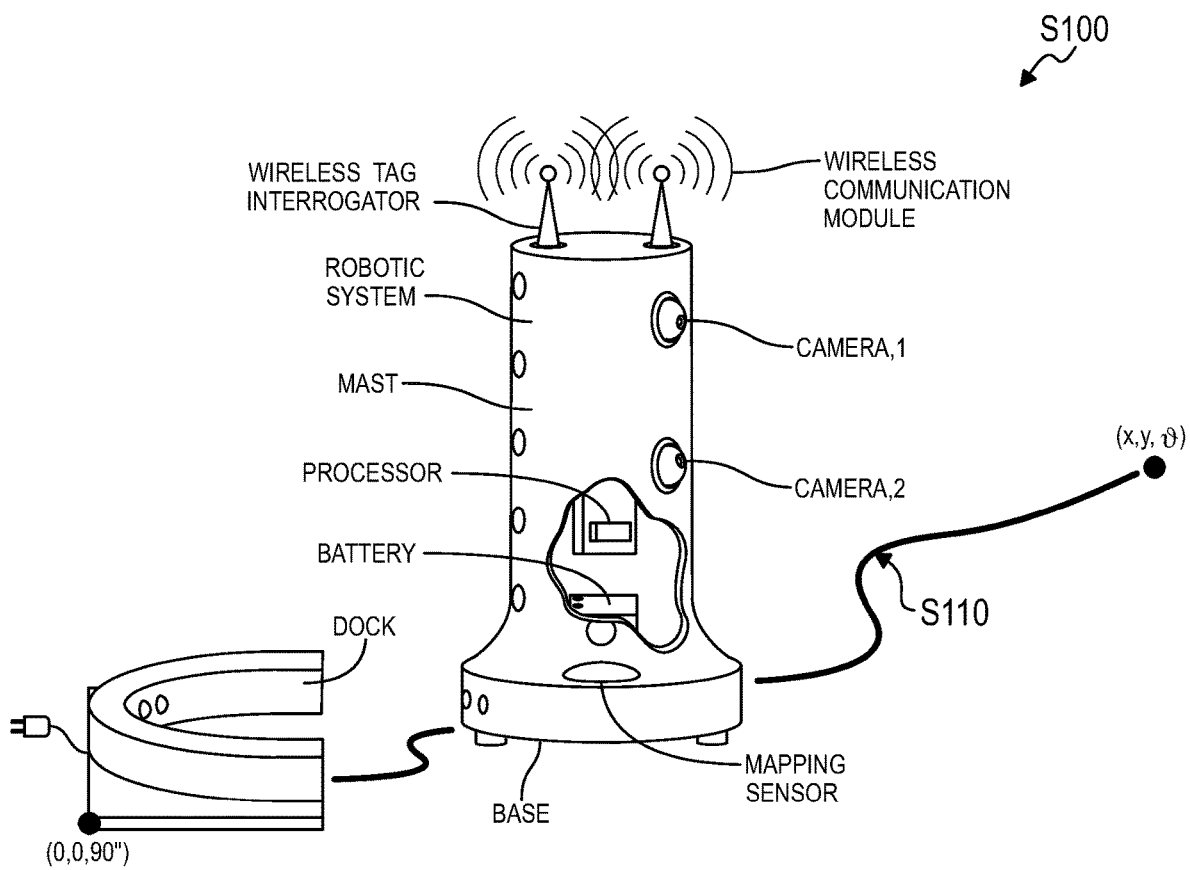
FIG. 2 is a schematic representation of one variation of the method.
Figure 3:
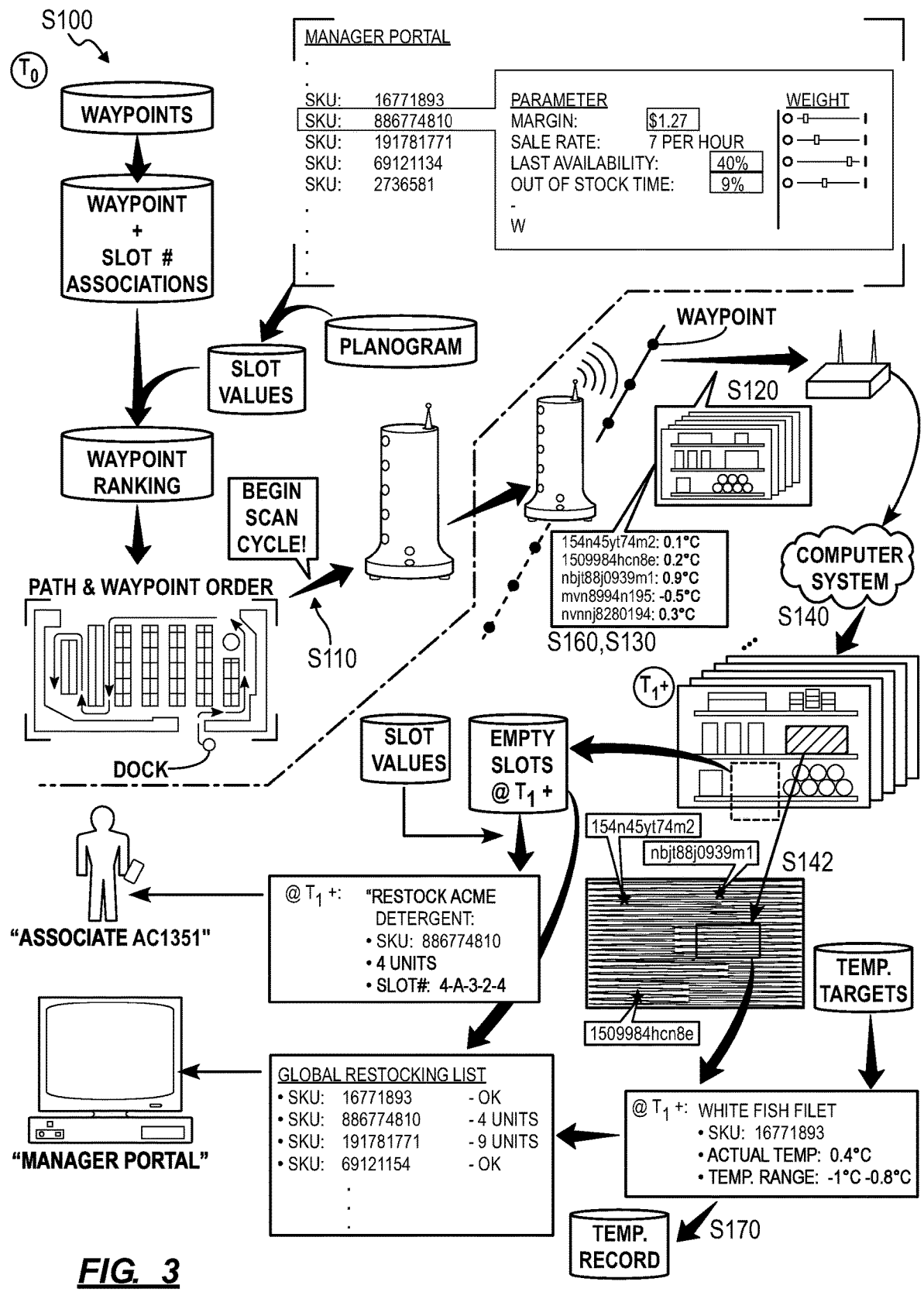
FIG. 3 is a flowchart representation of one variation of the method.

Generally, a robotic system can define a network-enabled mobile robot that can autonomously traverse a store, capture images of shelves within the store, and upload those images to a remote computer system for analysis, as shown in FIGS. 2 and 3. In particular, the robotic system executes Blocks S110, S120, S130, S160, and S130, etc. of the method S100 to: autonomously navigate throughout a store; capture color, thermographic, and/or depth images of shelving structures and temperature-controlled units throughout the store; query temperature-enabled transmitters distributed throughout temperature-controlled units in the store for temperature values; and/or collect ambient data throughout the store. The robotic system can then upload these (timestamped and georeferenced) scan data, temperature data, and ambient data to the remote computer system, such as over a cellular network or local area network in real-time during a scan routine or upon conclusion of the scan routine. The remote computer system can then execute Blocks of the method S100 described below to remotely process these data.

In one implementation, the robotic system defines an autonomous imaging vehicle including: a base; a drive system (e.g., a pair of two driven wheels and two swiveling castors) arranged in the base; a power supply (e.g., an electric battery); a set of depth sensors (e.g., fore and aft scanning LIDAR systems); a processor that transforms data collected by the depth sensors into two- or three-dimensional maps of a space around the robotic system; a mast extending vertically from the base; a set of cameras (e.g., color cameras, thermographic cameras, and/or depth sensors) arranged on the mast; a geospatial position sensor (e.g., a GPS sensor); and a wireless communication module that downloads a sequence of waypoints and a master map of a store from a remote computer system (e.g., a remote server) and that uploads color, thermographic, and/or depth images captured by sensors in the robotic system to the remote computer system, as shown in FIG. 2.

In this implementation, the robotic system can include cameras mounted statically to the mast, such as two vertically offset sets of color, thermographic, and depth sensors on a left side of the mast and two vertically offset sets of color, thermographic, and depth sensors on a right side of mast, as shown in FIG. 2. The robotic system can additionally or alternatively include articulable cameras, such as: one set of cameras on the left side of the mast and supported by a first vertical scanning actuator; and one set of cameras on the right side of the mast and supported by a second vertical scanning actuator. For example, each color camera can be configured to output a color (e.g., RGB) photographic image. Each depth sensor can include a LIDAR sensor, RADAR sensor, 3D stereoscopic camera, or structured-light 3D scanner, etc. configured to output one- or multi-dimensional depth images, wherein each pixel in a depth image contains a distance value from the depth sensor at the robotic system to an unique point on an adjacent surface (e.g., a surface of a product stored on a shelf in an adjacent cooling unit) in the field of view of the depth sensor. Each thermographic camera (or infrared camera, thermal imaging camera, etc.) can be configured to output 2D thermal images, wherein each pixel in a thermal image contains a thermal radiation value of a unique point on an adjacent surface (e.g., a surface of a product stored on a shelf in an adjacent cooling unit) in the field of view of the thermographic camera. The remote computer system (or the robotic system) can interpret the radiation value in a pixel in the thermal image as a temperature of the surface represented by this pixel, such as by correcting this radiation value based on distance between the robotic system the surface, ambient temperature, ambient humidity, and a known or predicted thermal coefficient (e.g., thermal emissivity) of the surface, as described below.

The robotic system can therefore further include: a temperature sensor configured to measure ambient temperature proximal the robotic system; a humidity sensor configured to measure ambient humidity proximal the robotic system (which may be correlated to humidity in the cooling unit, such as a function of distance from the humidity sensor in the robotic system to the cooling unit); and/or an ambient light sensor configured to measure an ambient light level proximal the robotic system.

The robotic system can also include a wireless transmitter and receiver that cooperate to broadcast an interrogation signal and to collect and discern inbound wireless signals broadcast from temperature-enabled transmitters—excited by the interrogation signal—located nearby. For example, the robotic system can include: a radio-frequency identification (or "RFID") antenna configured to broadcast an interrogation signal toward a temperature-controlled unit near the robotic system; and a RFID reader configured to read substantially unique electronic identifier (or "UUID") and temperature value pairs transmitted by RFID tags arranged within the temperature-controlled unit.

In one variation, the robotic system includes multiple RFID antennas. For example, the robotic system can include a first RFID antenna arranged in a first polarization orientation at a first position along the mast; and a second RFID antenna arranged in a second polarization orientation at a second position along the mast. In this example, the second polarization orientation can be angularly offset from the first polarization orientation by a known angle (e.g., 90°) about a horizontal axis of the robotic system; and the second position can be vertically offset above the first position by a known distance (e.g., 50 centimeters). During a scan routine, the robotic system can: trigger both the first and second RFID antennas to broadcast interrogation signals; collect RF signals through both the first and second RFID antennas; and compile these RF signals and related metadata into a 2D or 3D map of locations of RFID tags—from which these RF signals originated—based on known linear offsets between the first and second antennas. Furthermore, a particular RFID tag parallel to the plane of propagation of an interrogation signal broadcast by the first antenna may not return an RF signal to the robotic system; however, because the second antenna is angularly offset from the first antenna, the particular RFID tag may be necessarily non-parallel to the plane of propagation of an interrogation signal broadcast by the second antenna. Therefore, the robotic system can include two (or more) non-parallel RFID antennas in order to enable collection of RF signals from a greater proportion of nearby RFID tags, including RFID tags that may be obscured from one RFID antenna in the set, such as described in U.S. patent application Ser. No. 15/947,757.

However, the robotic system can define any other form and can include any other subsystems, elements, or sensors to enable the robotic system to autonomously navigate throughout a store to and record color, distance, thermal, and/or ambient data of shelving structures and cooling units throughout the store.

Furthermore, multiple instances of the robotic system can be placed in a single store and configured to cooperate to image shelving structures and temperature-controlled units within the store. For example, two robotic systems can be placed in a large, single-floor retail store and can cooperate to collect images of all shelving structures and temperature-controlled units in the store within a limited duration of time (e.g., within one hour). In another example, one robotic system can be placed on each floor of a multi-floor store, and each robotic system can collect images of shelves on its corresponding floor. The remote computer system can then aggregate images captured by multiple robotic systems placed in one store to generate a graph, map, table, and/or task list of properly- and improperly-stocked slots within the store.

4. Hierarchy and Terms

A "product facing" is referred to herein as a side of a product (e.g., of a particular SKU or other product identifier) designated for a slot. A "planogram" is referred to herein as a graphical representation of multiple product facings across each of multiple shelving structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section of a shelf designated for occupation by one product facing, such as including a row of one or more units of a product. A "shelf" is referred herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles.

Furthermore, a temperature-controlled unit is referred to herein as a unit containing one or more slots, shelves, and/or shelving segments and configured to store one or more products at a temperature above or below a nominal ambient indoor air temperature. An enclosed temperature-controlled unit (e.g., a freezer or refrigeration unit) can include a glass or otherwise transparent door that isolates a temperature-controlled interior cavity from an ambient environment.

5. Robotic System Dispatch

Block S110 of the method S100 recites, at the robotic system, autonomously navigating toward a cooling unit in the store during a scan cycle. Generally, in Block S110, the autonomous vehicle can autonomously navigate throughout the store, such as: during an inventory tracking routine in which the robotic system's primary function is to record images of inventory structures for product tracking and derivation of the current stock state of the store; or during a dedicated temperature monitoring routine in which the robotic system's primary function is to monitor temperatures of temperature-controlled units (or products contained in these temperature-controlled units more specifically).

5.1 Inventory Tracking Routine

In one implementation, the robotic system executes Blocks of the method S100 while executing an inventory tracking routine within the store. In this implementation and as shown in FIG. 3, the remote computer system (e.g., a remote server connected to the robotic system via the Internet): defines a set of waypoints specifying target locations within the store at which the robotic system is to navigate and capture images of inventory structure throughout the store; and intermittently (e.g., twice per day) dispatches the robotic system to navigate through this sequence of waypoints and to record images of inventory structures nearby during an inventory tracking routine. For example, the robotic system can be installed within a retail store (or a warehouse, etc.), and the remote computer system can dispatch the robotic system to execute an inventory tracking routine during store hours, including navigating to each waypoint throughout the retail store and collecting data representative of the stock state of the store in real-time as patrons move, remove, and occasionally return product on, from, and to inventory structures throughout the store. Alternatively, the remote computer system can dispatch the robotic system to execute this inventory tracking routine outside of store hours, such as every night beginning at 1 AM. The robotic system can thus complete an inventory tracking routine before the retail store opens hours later.

In a similar implementation, the remote computer system: dispatches the robotic system to navigate along aisles within the store (e.g., through the sequence of predefined waypoints within the store) and to capture images of products arranged on inventory structures (e.g., shelving structures, refrigeration units and other temperature-controlled units, displays, hanging racks, cubbies, etc.) throughout the store during an inventory tracking routine; downloads color images of these inventory structures recorded by the robotic system; and implements image processing, computer vision, artificial intelligence, deep learning, and/or other methods and techniques to estimate the current stocking status of these inventory structures based on products detected in these images. The robotic system can additionally or alternatively broadcast radio frequency queries and record RFID data from RFID tags arranged on or integrated into products stocked throughout the store during the inventory tracking routine; and the remote computer system can download these RFID data from the robotic system and detect locations and quantities of products throughout the store based on these data. The remote computer system can then automatically generate a stocking report for the store, such as including slots or other product locations that are sufficiently stocked, understocked, incorrectly stocked, and/or disheveled as described in U.S. patent application Ser. No. 15/347,689.

For example, the robotic system can be placed within a retail store (or warehouse, etc.). The remote computer system can: dispatch the robotic system to collect data at waypoints throughout the retail store outside of store hours, such as every night beginning at 1 AM. The robotic system can thus complete a scan routine before the retail store opens a few hours later; process these data to generate a map of current product placement on shelves in the store and/or to generate a task list of misplaced or misoriented products to correct; and then present a map and/or a task list to associates upon their arrival at the retail store the next morning before the retail store opens. The remote computer system can additionally or alternatively dispatch the robotic system to execute a scan routine during open store hours and can process data received from the robotic system substantially in real-time to generate such maps and/or task lists in near-real-time.

The remote computer system can therefore maintain, update, and distribute a set of waypoints to the robotic system, wherein each waypoint defines a location within a store at which the robotic system is to capture one or more images from the integrated thermographic, depth, and/or color cameras. In one implementation, the remote computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the remote computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system, as shown in FIG. 5. When executing a waypoint, the robotic system can orient to (e.g., within 1.5° of) the target orientation defined in the waypoint in order to align a camera to an adjacent shelving structure.

When navigating to a waypoint, the robotic system can scan an environment nearby with the depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,∂) location and target orientation defined in the waypoint. A waypoint can also include a geospatial position (e.g., a GPS location), such as in the form of a backup or redundant location. For example, when navigating to a waypoint, the robotic system can approach the geospatial position defined in the waypoint; once within a threshold distance (e.g., five feet) from the geospatial position, the remote computer system can navigate to a position and orientation at which the output of the depth sensor aligns—within a threshold distance and angle—with a region of the master map corresponding to the (x,y,∂) location and target orientation defined in the waypoint.

Furthermore, a waypoint can include an address of each camera that is to capture an image once the robotic system can navigate to the waypoint. For example, for the robotic system that includes a thermographic camera, a depth camera, and a color camera, the waypoint can include all or a subset of camera addresses [1, 2, 3] corresponding to a thermographic camera, a depth camera, and a color camera, respectively. Alternatively, for the robotic system that includes articulable cameras, a waypoint can define an address and arcuate position of each camera that is to capture an image at the waypoint. Similarly, a waypoint can include a specification for: recordation of a thermal image, an ambient humidity, and/or an ambient temperature; and/or for broadcasting a querying to temperature-enabled transmitters (e.g., RFID tags) nearby. The robotic system can then record color images, depth maps, thermal images, ambient humidity data, ambient temperature data, and/or transmitter identifier and temperature value pairs when occupying a waypoint based on a data specification contained in this waypoint.

In one implementation, before initiating a new inventory tracking routine, the robotic system can download—from the remote computer system—a set of waypoints, a preferred order for the waypoints, and a master map of the store defining the coordinate system of the store. Once the robotic system leaves its dock at the beginning of an inventory tracking routine, the robotic system can repeatedly sample its integrated depth sensors (e.g., a LIDAR sensor) and construct a new map of its environment based on data collected by the depth sensors. By comparing the new map to the master map, the robotic system can track its location within the store throughout the inventory tracking routine. Furthermore, to navigate to a next waypoint, the robotic system can confirm its achievement of the waypoint—within a threshold distance and angular offset—based on alignment between a region of the master map corresponding to the (x,y,∂) location and target orientation defined in the current waypoint and a current output of the depth sensors, as described above.

Alternatively, the robotic system can execute a waypoint defining a GPS location and compass heading and can confirm achievement of the waypoint based on outputs of a GPS sensor and compass sensor within the robotic system. However, the robotic system can implement any other methods or techniques to navigate to a position and orientation within the store within a threshold distance and angular offset from a location and target orientation defined in a waypoint.

Yet alternatively, during an inventory tracking routine, the robotic system can autonomously generate a path throughout the store and execute this path in real-time based on: obstacles (e.g., patrons, spills, inventory structures) detected nearby; priority or weights previously assigned to inventory structures, temperature-controlled units, or particular slots within the store; and/or product sale data from a point-of-sale system connected to the store and known locations of products in the store, such as defined in a planogram; etc. For example, the computer system can dynamically generate its path throughout the store during an inventory tracking routine to maximize a value of inventory structures or particular products imaged by the robotic system per unit time responsive to dynamic obstacles within the store (e.g., patrons, spills, shopping carts), such as described in U.S. patent application Ser. No. 15/347,689.

Therefore, in this implementation, the robotic system can autonomously navigate along a set of aisles within the store during an inventory tracking routine. While autonomously navigating along a particular aisle in this set of aisles in the store, the robotic system can: record a set of color images of a set of shelving structures facing the particular aisle; record a thermal image of the particular aisle at a first time and/or query temperature-enabled transmitters nearby; record ambient data; and then upload these data—such as in real-time or upon conclusion of the inventory tracking routine—to the remote computer system for processing as described below. In this implementation, the robotic system can repeat the foregoing process to record similar data images along each inventory structure and temperature-controlled unit in the store during the inventory tracking routine; and the remote computer system can similarly process these data to derive a current stocking state of the entire store.

5.2 Dedicated Temperature Monitoring Routine

Additionally or alternatively, the robotic system can autonomously navigate throughout the store and execute Blocks of the method S100 to specifically track temperatures of temperature-controlled units and/or products contained therein. For example, when not executing inventory tracking routines and recharging at a dock located in the store and/or during high traffic periods in the store, the robotic system can autonomously execute a dedicated temperature monitoring routine, including: sequentially navigating to each temperature-controlled unit in the store; executing Blocks of the method S100 to record color images, depth maps, thermal images, depth maps, transmitter identifier and temperature value pairs, and/or ambient data; and then transmitting these data to the remote computer system for processing.

In one implementation, the remote computer system can access a planogram of the store; scan the planogram to identify each temperature-controlled unit in the store. The remote computer system can then assign priorities to scanning these temperature-controlled units: as a function of (e.g., proportional to) size, age, or magnitude last detected spatial or temporal temperature variance of these temperature-controlled units; in order of value of products stocked in these temperature-controlled units; and/or in order to temperature sensitivity of products stored in these temperature-controlled units (e.g., highest priority for cooked foods in a buffet-style hot food display; high priority for dairy goods contained in an open cooling unit; moderate priority for ice cream; low priority for refrigerated dairy goods in an enclosed cooling unit). During a next temperature monitoring routine, the robotic system can autonomously navigate between these temperature-controlled units and scan these temperature-controlled units according to their priority (and a route that minimizes distance or time traveled).

Furthermore, the robotic system can execute temperature monitoring routines separately from inventory tracking routines in the store. Alternately, the computer system can execute consecutive inventory tracking and temperature monitoring routines. For example, the robotic system can navigate off of its dock and initiate an inventory tracking routine at a scheduled time. Upon completing the inventory tracking routine, the robotic system can transition to executing a temperature monitoring routine until a charge state of the robotic system drops below a low threshold, at which time the robotic system can navigate back to its dock to recharge before a next scheduled inventory tracking routine.

6. Scan Routine

Block S120 of the method S100 recites recording a color image of the cooling unit; and Block S130 of the method S100 recites scanning a set of temperatures within the cooling unit. Generally, in Block S120, the robotic system can record a color image (e.g., a digital color photographic image) of a temperature-controlled unit, which the remote computer system (or the robotic system) can then process to identify products currently stocked in the temperature-controlled unit. In Block S130, the robotic system can collect temperature-related data of the temperature-controlled unit and/or products contained therein, such as in the form of a thermographic image and/or in the form of transmitter identifier and temperature value pairs.

In one implementation, upon reaching the latitude and longitude prescribed by a waypoint adjacent a temperature-controlled unit, the robotic system can: orient itself according to a direction specified by the waypoint (e.g., to face the temperature-controlled unit); and record a set of static color images of the temperature-controlled unit in Block S120, as shown in FIG. 3. Alternatively, in one implementation in which the autonomous vehicle navigates throughout the store without waypoints, the robotic system can: monitor its proximity to a temperature-controlled unit nearby by comparing its location to a planogram of the store; align itself to the face of a temperature-controlled unit while navigating past this temperature-controlled unit; and record a video or a sequence of frames (i.e., color images) of the temperature-controlled unit while navigating past this temperature-controlled unit.

If the temperature-controlled unit and/or adjacent waypoints are tagged with a specification for thermal image collection, the robotic system can similarly record thermal images of the temperature-controlled unit via the thermographic camera in Block S130, as described below. Additionally or alternatively, if the temperature-controlled unit and/or adjacent waypoints are tagged with a specification for querying nearby RFID tags, the robotic system can record transmitter identifier and temperature value pairs received from RFID tags located in the temperature-controlled unit in Block S130, such after broadcasting a query to these RFID tags as while navigating past the temperature-controlled unit in Block S160 as described below.

Upon recording these data, the robotic system can navigate to a next waypoint in the sequence or to a next temperature-controlled unit and repeat this process, as shown in FIG. 3.

The robotic system can then transmit these data to the remote system for remote processing, such as: in real-time when these data are recorded; in batches as the robotic system completes a subset of waypoints during the scan routine; or upon conclusion of the scan routine.

7. Product Detection

Block S140 of the method S100 recites identifying a set of products stocked in the cooling unit based on features detected in the color image. Generally, in Block S140, the remote computer system (or the robotic system) can process color image data recorded by the robotic system during the scan routine to detect and identify products stocked throughout the store, such as in both shelving structures, open temperature-controlled units, and enclosed temperature-controlled units. For example, the remote computer system can implement methods and techniques described in Ser. No. 15/600,527 to identify products currently stocked in the store based on features detected in these color images recorded by the robotic system.

In one example shown in FIGS. 1 and 3, upon receipt of a set of color images from the robotic system, the remote computer system can: detect a first shelf in a first temperature-controlled unit in a first region of a first color image—in the set of color images received—recorded by the robotic system at approximately a first time; identify an address of the first shelf; retrieve a first list of products assigned to the first shelf by a planogram of the store based on the address of the first shelf; retrieve a first set of template images from a database of template images, wherein each template image in the first set of template images depicts visual features of a product in the first list of products; extract a first set of features from the first region of the first color image; and determine that a unit of the first product is improperly stocked on the first shelf in response to deviation between features in the first set of features and features in the first template image. Then, in response to determining that the unit of the first product is improperly stocked on the first shelf, the remote computer system can generate a restocking prompt for the first product on the first shelf and serve this restocking prompt to an associate of the store in real-time or append the restocking prompt to a current restocking list for the store, which the remote computer system later serves the associate of the store upon conclusion of the inventory tracking routine, such as described in U.S. patent application Ser. No. 15/600,527.

Furthermore, the remote computer system can; annotate a color image of a temperature-controlled unit with product identifiers (e.g., SKU values) of products thus detected in this color image; generate a spatial map of these product identifiers based on locations of corresponding products detected in the color image; and/or generate or update a realogram that depicts locations of the products. The remote computer system can then compare spatial or georeferenced temperature data collected by the robotic system during this scan cycle to this annotated color image, spatial map, or realogram when mapping these temperature data to individual products stocked in the temperature-controlled unit in Block S142 described below.

The emote computer system can repeat the foregoing processes to derive a current stocking state and to generate annotated color images, spatial maps, or realograms of other temperature-controlled units and/or other inventory structures throughout the store based on other color images recorded by the robotic system during this scan routine.

The remote computer system can also aggregate these temperature-controlled unit and inventory structures stocking states to quantify or qualify the total current stocking state of the store and to generate prompts to correct or restock these temperature-controlled units and/or inventory structures responsive to detecting deviation from a predefined planogram of the store. For example, the remote computer system can: detect a first shelf of the cooling unit in a first region of the color image; identify an address of the first shelf; based on the address of the first shelf, retrieve a first set of template images from a database of template images, wherein each template image in the first set of template images depicts visual features of a product in the first list of products assigned to the first shelf by the planogram of the store; extract a first set of features from the first region of the color image; and identify presence of a first subset of products, in the first list of products, on the first shelf based on alignment of the first set of features and template images in the first set of template images. However, the remote computer system can also: detect absence of a first product, in the first list of products, on the first shelf in response to absence of features, in the first set of features, that align with template images, in the first set of template images, depicting the first product; generate a restocking prompt to restock the first shelf with units of the first product in response to detecting absence of the first product on the first shelf; and serve this restocking prompt to a computing device affiliated with an associate of the store. Additionally or alternatively, the robotic system can aggregate deviation from the planogram into a global restocking list for the store.

However, the remote computer system can implement any other method or technique to detect and identify individual products present in temperature-controlled units and other inventory structures depicted in color images recorded by the robotic system during a scan routine.

8. Temperature Detection and Recordation

Blocks S140, S142, and S110 of the method S100 recite: identifying a set of products stocked in the cooling unit based on features detected in the color image; mapping the set of temperatures to the set of products at a first time during the first scan routine based on positions of products in the set of products identified in the color image; and generating a record of temperatures of the set of products stocked in the cooling unit at the first time, respectively. Generally, in Blocks S140, S142, and S110, the remote computer system (and/or the robotic system) can execute methods and techniques described below to calculate and store temperatures of individual products, slots, shelves, reference surfaces, and/or the whole of temperature-controlled units throughout the store.

For example, upon detecting a unit of a product arranged in a slot on a shelf in a cooling unit and accessing or calculating a temperature of the product as described below, the remote computer system can append a product temperature database with a temperature of the product, a time and date the temperature was measured, and a slot address for the unit of the product in Block S110. Similarly, the remote computer system can append a slot temperature database with this temperature of the product, the time and date, and an address of this slot in this temperature-controlled unit in Block S110. Furthermore, the remote computer system can append a shelf temperature database with average, minimum, maximum, and spatial variance temperatures of a set of product on the self, the time and date, and an address of this shelf in this temperature-controlled unit. The remote computer system can also append a temperature-controlled unit database with average, minimum, maximum, and spatial variance temperatures of products and/or reference surfaces in the temperature-controlled unit, the time and date, and an address or other identifier of this temperature-controlled unit.

The remote computer system can repeat this process over time based on data recorded by the robotic system during subsequent scan routines in order to generate timeseries of average, minimum, maximum, and/or spatial variance temperatures of products, slots, shelves, and/or the whole of the temperature-controlled unit. From these timeseries data, the remote computer system can also estimate temporal variance of average, minimum, or maximum temperatures of products, slots, shelves, and/or the whole of the temperature-controlled unit. From these timeseries data, the remote computer system can additionally or alternatively track total temperature exposure of individual products stocked in the store over time, which may indicate a freshness or remaining shelf life of these individual products.

9. Open Temperature-Controlled Unit/Thermographic Camera

In one variation shown in FIG. 1, the robotic system: autonomously navigates toward an open cooling unit in Block S110; records a color image and a depth image of the open cooling unit in Block S120; records a thermal image of the open cooling unit in Block S130; and records an ambient temperature, an ambient humidity, and an ambient light level proximal the robotic system in Block S132. In particular, in this variation, the robotic system records a color image, a depth map, a thermal image, and ambient data sufficient to enable the remote computer system to estimate temperatures of products contained in an open cooling unit (or open heating unit) without access to data from additional temperature-enabled transmitters (e.g., temperature-enabled RFID tags) or other wireless infrastructure deployed to the open cooling unit.

In one implementation, upon arriving adjacent an open cooling unit (e.g., a door-less refrigeration unit) during a scan routine, the robotic system can record a thermal image of the cooling unit—via the thermographic camera—in Block S130 in addition to recording a color image of the cooling unit in Block S120. By aligning the thermal image to products detected in the color image of the cooling unit—such as based on a known offset between the color and thermographic cameras—the remote computer system can determine temperatures of these products at the time these images were recorded.

However, ambient conditions, thermal emissivity or reflectivity of these products or product packagings, and distances from the thermographic camera in the robotic system to these products stored in the temperature-controlled unit, etc. may introduce errors in interpretation of product temperatures directly from the thermal image. For example, products stocked in a cooling unit may not all exhibit the same thermal emissivity and may not radiate energy as perfect black bodies. A thermal image of this cooling unit—recorded via the thermographic camera in the robotic system—may therefore contain thermal values that represent combinations of temperatures and thermal emissivities of these products rather than temperatures of these products exclusively such that true temperatures of these products differ from temperatures depicted in the thermal image by as much as several degrees Celsius.

The robotic system can therefore also record a depth image and ambient conditions while recording a color image and a thermal image of the open cooling unit in Blocks S120 and S130. The remote computer system can then implement an atmospheric correction model (hereinafter a "physics model") to transform measures of thermal radiation from surfaces of products stocked in the cooling unit—stored as pixel values in the thermal image—into temperatures of these products in Block S156 based on: thermal radiation characteristics associated with these identified products; the ambient conditions; and distances from the thermographic camera to these products calculated in Block S154, as shown in FIG. 1.

9.1 Thermal Coefficient

In particular, once these color, depth, thermal, and ambient data are recorded by the robotic system and uploaded to the remote computer system, the system can implement methods and techniques described above to identify products in these color images of temperature-controlled units throughout the store. As described above, the remote computer system can also: annotate these color images with product identifiers; generate spatial maps of products in these temperature-controlled units; or generate a realogram (or other virtual graphical representations) of the current stock states of these temperature-controlled units based on products identified in these color images. Then, once the remote computer system identifies a set of products in a particular cooling unit, the remote computer system can query a database of thermal coefficients of products and product packagings for the thermal coefficients (e.g., thermal emissivities) of each product identified in this cooling unit. (Alternatively, product template images accessed by the remote computer system to identify products depicted in the color image of the cooling unit can be annotated with known thermal coefficients of products or product packagings depicted in this template images.)

Therefore, once the system identifies a product in a cooling unit, the system can leverage its derived knowledge of the identity of a product in a cooling unit to access a thermal coefficient of the product (e.g., an emissivity of the product's packaging), which the system can later pass into a physics model to transform or "correct" the temperature of the product read from the original thermal image.

9.2 Ambient Effects

Furthermore, a volume between a product in a cooling unit and the robotic system may be other than vacuum, which may introduce further error between the true temperatures of the product and a temperature contained in a region of the thermal image depicted this product. The remote computer system can therefore also leverage other ambient data—such as air temperature, air humidity, and ambient light level—recorded by the robotic system concurrently with the thermal image to further correct a temperature of the product read from the thermal image. In particular, the system can fuse data from multiple sensors integrated into the robotic system to correct for assumptions (e.g., blackbody radiation in a vacuum) of the thermographic camera to achieve greater accuracy and repeatability of measured temperatures of products in cooling units throughout the store.

9.3 Mapping

In Block S142, the remote computer system can then map a set of temperatures—extracted from the thermal image of the cooling unit and corrected based on product emissivity, distance, ambient temperature, ambient humidity, and/or ambient light level, etc.—to corresponding products stocked in the store based on positions of these products identified in the color image of the open cooling unit.

In one implementation, the remote controller: selects a thermal image of an open cooling unit recorded by the robotic system during a scan routine; aligns the thermal image to a color image and to a depth image recorded substantially simultaneously by the robotic system, such as based on known relative positions and orientations of the thermographic camera, the color camera, and the depth sensor on the robotic system; implements methods and techniques described above to detect and identify products depicted in the color image; delineates boundaries of each product detected in the color image; tags each bounded region in the color image with product metadata, such as thermal coefficients (e.g., thermal emissivities) associated with each of these products and accessed from a product database or linked to template images of these products, as described above; projects metadata and a boundary of each product detected in the color image onto the thermal image to define a set of discrete regions in the thermal image that each depict one product stocked in the cooling unit; and tags each discrete region in the thermal image with ambient conditions—such as including air temperature, air humidity, and ambient light level—recorded by the robotic system approximately concurrently with the thermal image.

For one discrete region depicting one product in the thermal image, the remote computer system can then: select a representative thermal pixel (e.g., a center pixel, an average of a center cluster of pixels) in the discrete region of the thermal image; and calculate a pixel distance from the thermographic camera to the representative thermal pixel based on a known distance between the thermographic camera and the depth sensor and based on a depth value stored in a depth pixel in the depth image nearest the representative thermal pixel in the thermal image. The remote computer system can then pass a thermal value (e.g., an uncorrected temperature) stored in the representative thermal pixel, the pixel distance, and the thermal coefficient and ambient conditions tagged to this region of the thermal image into a physics model. The physics model can thus output a corrected temperature of the product coinciding with this discrete region of the thermal image based on these input values. Finally, the remote computer system can store this output of the physics model as a corrected temperature of the product—depicted in this region of the thermal image—at a time that the thermal image was recorded by the robotic system.

In this implementation, the remote computer system can also repeat this process to correct temperatures of multiple representative thermal pixels in one discrete region of the thermal image depicting one product in the open cooling unit. For example, the robotic system computer system can: implement the foregoing process to transform thermal values stored in a set of ten pixels selected (randomly) within a region of the thermal image depicting one product; average or otherwise combine these derived temperatures; and store this combined temperature as a temperature of the product at the time the thermal image was recorded. The remote computer system can then repeat this process for each other discrete regions depicting a product facing in the thermal image.

In a similar implementation, rather than processing sets of singular thermal, color, and depth images, the remote computer system can compile many thermal, color, and depth images recorded by the robotic system during a scan routine into composite thermal, color, and depth images representing complete cooling units, complete rows of adjacent cooling units, or complete aisles in the store. The remote computer system can then implement methods and techniques described in the foregoing implementation to: delineate regions of a composite thermal image corresponding to products detected in a composite color image (or indicated in a realogram or other spatial product map derived from a composite color image); select representative thermal pixels in these regions of the composite thermal image; and pass temperature values, distance data, thermal coefficients, and ambient data from the composite thermal and depth images into the physics model to calculate corrected temperatures of products depicted in each of these product regions in the composite thermal image.

Furthermore, the remote computer system can implement similar methods and techniques to: detect reference surfaces in a cooling unit, such as corners of the cooling unit or a shelf face in the cooling unit; and to derive corrected temperatures of these reference surfaces. The remote computer system can thus monitor corrected temperatures of these references surfaces in the cooling unit over time in order to track performance of the cooling unit, predict maintenance, needs, and serve prompts for preemptive maintenance or replacement of the cooling unit to store associates accordingly over time.

9.4 Mapping Example

Therefore, in one example, the robotic system can: autonomously navigate toward an open cooling unit in Block S110; record a color image and a depth image of the open cooling unit in Block S120; record a thermal image of the open cooling unit in Block S130; and record an ambient temperature, an ambient humidity, and an ambient light level proximal the robotic system in Block S132 during a scan routine. The robotic system can then upload these data to the remote computer system, such as in real-time or upon conclusion of the scan routine. Upon receipt of these data, the remote computer system can identify a stock keeping unit (or "SKU") of each product in the set of products based on features detected in the color image in Block S140, such as by matching these features in the color image to template images of products allocated to this open cooling unit by the store planogram or based on a computer vision model (or a machine learning, deep learning, or other perception model). The remote computer system can then: select a first product depicted and identified in the color image; project a boundary of the first product onto the thermal image based on a known offset between the color camera and the thermographic camera on the robotic system; and project the boundary of the first product onto the concurrent depth map image based on a known offset between the color camera and the depth sensor on the robotic system. The remote computer system can also retrieve a stored emissivity of a surface of the first product from a database based on an identity of the first product in Block S150, such as by querying the database for the stored emissivity of packaging associated with the first stock keeping unit of the first product. The remote computer system can then: select a thermal pixel in the thermal image depicting the first product; calculate a distance from the robotic system (or the thermographic camera in particular) to the first product (e.g., to a surface on the first product depicted by the thermal pixel) based on the depth image in Block S154; and then pass the emissivity of the surface of the first product, the thermal value stored in the thermal pixel, the distance, the measured ambient temperature proximal the open cooling unit, the measured ambient humidity proximal the open cooling unit, and the measured ambient light level proximal the open cooling unit into a physics model to calculate the temperature of the first product at the first time in Block S156.

In this example, the remote computer system can implement a physics model that includes the following equations to derive the corrected temperature of the first product:

$$W_{tot} = \varepsilon \cdot \tau \cdot W_{obj} + (1-\varepsilon) \cdot \tau \cdot W_{refl} + (1-\tau) \cdot W_{atm} =$$
$$\varepsilon \cdot \tau \cdot \sigma \cdot T_{obj}^4 + (1-\varepsilon) \cdot \tau \cdot \sigma \cdot T_{refl}^4 + (1-\tau) \cdot \sigma \cdot T_{atm}^4$$

$$T_{obj} = \sqrt[4]{\frac{W_{tot} - (1-\varepsilon) \cdot \tau \cdot \sigma \cdot T_{refl}^4 - (1-\tau) \cdot \sigma \cdot T_{atm}^4}{\varepsilon \cdot \tau \cdot \sigma}}$$

$$\tau(d, \omega) =$$
$$K_{atm} \cdot \exp\left[-\sqrt{d}\left(\alpha_1 + \beta_1\sqrt{\omega}\right)\right] + (1 - K_{atm}) \cdot \exp\left[-\sqrt{d}\left(\alpha_2 + \beta_2\sqrt{\omega}\right)\right]$$

$$\omega(\omega_\%, T_{atm}) = \omega_\% \cdot \exp(h_1 + h_2 \cdot T_{atm} + h_3 \cdot T_{atm}^2 + h_4 \cdot T_{atm}^3)$$

wherein: $W_{tot}$ is the total radiation received by the thermographic camera and depicted in the thermal image; $\varepsilon \cdot \tau \cdot W_{obj}$ is the emission of the product; $(1-\varepsilon) \cdot \tau \cdot W_{refl}$ is the emission of the surroundings and reflected by the product; $(1-\tau) \cdot W_{atm}$ is the emission of the atmosphere (e.g., a function of ambient light level); $\sigma$ is the Stefan Boltzmann constant (5.67×10-8 W/m); $\varepsilon$ is the stored emissivity of the first product or first product packaging; $\tau$ is the transmittance of the atmosphere; $T_{refl}$ is the reflected temperature; $T_{atm}$ is the atmospheric/ambient temperature measured by the robotic system; d is the distance from the thermal pixel to the thermographic camera; $\omega$ is a coefficient indicating content of water vapor in the atmosphere; $\omega$ % is the relative humidity measured by the robotic system; $K_{atm}$ is a scaling factor for the atmosphere damping; $\alpha_1$, $\alpha_2$ represent attenuation values for atmosphere without water vapor; $\beta_1$, $\beta_2$ represent attenuation values for water vapor; and $T_{obj}$ is the temperature of the product.

The remote computer system can: execute this process to derive a corrected temperature of each other product detected in the color image; and then store these corrected temperatures, such as in a database of timestamped temperature values for individual products, slots, or shelves in the open cooling unit or for the open cooling unit generally, such as described below. For example, the remote computer system can aggregate corrected temperature derived from data recorded by the robotic system during multiple scan routines executed over time (e.g., days, weeks, months) into timeseries of temperatures in each slot in the open cooling unit over this period of time.

10. Short-Range Wireless Communication Tags

In one variation, enclosed cooling units throughout the store are outfitted with temperature-enabled transmitters, such as RFID (or NFC) tags with integrated temperature sensors, each configured to broadcast a unique electronic identifier and a temperature value read from its integrated temperature sensor upon receipt of an excitation signal (e.g., from a wireless transmitter integrated into the robotic system). In particular, a glass door on a cooling unit may optically obscure surfaces of products stocked inside the cooling unit from a thermographic camera integrated into the robotic system. More specifically, the glass in the door of a cooling unit may be opaque to the thermal radiation emanating from products stored inside the cooling unit, thereby inhibiting temperature monitoring of these products via the thermographic camera.

Therefore, one or more temperature-enabled RFID (or similar) tags can be arranged inside enclosed cooling units (e.g., freezers and refrigerators with doors) throughout the store, and the robotic system can read temperatures from these temperature-enabled RFID tags. For example, a temperature-enabled RFID tag can be arranged at or adjacent each slot in an enclosed cooling unit. In another example, a linear array of temperature-enabled RFID tags is arranged across each shelf in the cooling unit, such as one RFID tag per linear meter of horizontal shelf per cooling unit. In a similar example, a grid array of temperature-enabled RFID tags is arranged throughout a cooling unit, such as according to a horizontal offset of approximately one meter and a vertical offset of approximately one-half meter between adjacent temperature-enabled RFID tags.

Furthermore, in this variation, the robotic system can include one or more readers (e.g., wireless tag interrogator, RFID readers) configured to broadcast an excitation signal and to subsequently receive a unique electronic identifier paired with temperature values from nearby temperature-enabled transmitters.

However, open and enclosed cooling units throughout the store can be outfitted (e.g., retrofitted) with temperature-enabled transmitters of any other type and in any other arrangement, and the robotic system can be configured to retrieve temperature values from these temperature-enabled transmitters in any other way.

10.1 Scanning

Therefore, in this variation, the robotic system can: autonomously navigate toward the cooling unit comprising an enclosed cooling unit in Block S110; record a color image of the enclosed cooling unit (since a glass door of the enclosed cooling unit may still be substantially transparent to the color camera in the robotic system) in Block S120; broadcast a query to a set of temperature-enabled transmitters arranged in the enclosed cooling unit in Block S160; and record a set of temperature values received from the set of temperature-enabled transmitters in Block S130 during a scan routine, as shown in FIGS. 1 and 3.

In one implementation, when occupying a waypoint specifying collection of temperature data from nearby RFID tags during a scan routine, the robotic system can: broadcast a query for temperature values from a set of temperature-enabled transmitters arranged in the temperature-controlled unit in Block S160; and record a set of temperature values transmitted by the set of temperature-enabled transmitters in Block S130. In particular, the robotic system can: sequentially navigate through a sequence of waypoints defined for the store, as described above, in Block S110. For each waypoint specifying collection of temperature data from nearby RFID tags, the robotic system can also broadcast an excitation signal via the RFID reader in Block S160 and thus collect unique electronic identifiers and temperature values from RFID tags nearby in Block S130, as shown in FIG. 1. Therefore, in this implementation, the robotic system can: interrogate a set of temperature-enabled RFID tags arranged in the enclosed cooling unit in Block S160 in response to occupying a particular waypoint that indicates proximity of temperature-enabled RFID tags or in response to occupying a location in the store near a temperature-controlled unit known to contain temperature-enabled RFID tags; and then record unique electronic identifier and temperature value pairs received from these RFID tags in Block S130.

(Alternatively, self-powered (e.g., battery-powered, wall-powered) temperature-enabled tags can be arranged in enclosed cooling units throughout the store, and the robotic system can broadcast query signals to these self-powered temperature-enabled tags and recorded temperature values thus returned by these self-powered temperature-enabled tags.)

10.2 RFID Tag Location

The robotic system can also derive locations of these RFID tags (or other temperature-enabled transmitters) in the enclosed cooling unit and store temperature values received during this scan routine with their corresponding tag locations prior to uploading these temperature data to the remote computer system.

In one implementation, the robotic system: calculates an origin of a signal—carrying a unique electronic identifier and temperature value broadcast by an RFID tag in a cooling unit—relative to the robotic system (e.g., relative to an antenna of the RFID reader integrated into the robotic system). For example, the robotic system can implement triangulation techniques or phase-of-arrival techniques to calculate the origin—in three-dimensional space—of such a signal relative to the robotic system. The robotic system can then calculate an absolute geospatial location (e.g., latitude, longitude, and height above the floor of the store) within a coordinate system assigned to the store based on the calculated origin of the signal relative to the robotic system and the position and orientation of the robotic system in this coordinate system at a time that the signal was received by the robotic system. The robotic system can then tag the unique electronic identifier and temperature value carried by this signal with this absolute geospatial location in the store.

In another implementation, temperature-enabled RFID tags are labeled with unique optical fiducials, such as unique barcodes or quick-response (or "QR") codes. A lookup table or other database can also define links between unique optical fiducials and unique electronic identifiers broadcast—with temperature values—by these RFID tags when queried (or "interrogated"). In this implementation, a temperature-enabled RFID tag can be installed (e.g., adhered) onto a temperature-controlled unit with its unique optical fiducial facing outwardly toward an adjacent aisle such that the optical fiducial falls into the field of view of a color camera on the robotic system when the robotic system faces this temperature-controlled unit. Therefore, when the robotic system captures a color image of the temperature-controlled unit during a scan routine in Block S120, this color image may depict the unique optical fiducials on this RFID tag. Furthermore, upon receipt of this color image and a set of transmitter identifier and temperature value pairs recorded by the robotic system during this scan routine, the remote computer system can: detect a set of optical fiducials representing these RFID tags in the color image; query the lookup table or other database with these optical fiducials in order to retrieve unique electronic identifiers linked to each of these optical fiducials; and link temperature values received from these RFID tags during the scan routine to locations—on the temperature-controlled unit—of corresponding optical fiducials detected in the color image. In particular, for each temperature value in the set of temperature values received from the robotic system, the remote computer system can link the temperature value to a location of an optical fiducial—in the set of optical fiducials detected in the color image—associated with the unique electronic identifier received with this temperature value. Therefore, in this implementation, the remote computer system can detect and identify RFID tags directly in a color image of a temperature-controlled unit and then link temperature values received from these RFID tags to discrete 3D locations in the store (and in the temperature-controlled unit more specifically) based on known associations between optical fiducials on these RFID tags and electronic identifiers broadcast by these RFID tags.

Alternatively, absolute geospatial locations—within the coordinate system assigned to the store—of each temperature-enabled RFID tag can be stored in a lookup table or other database. Upon receipt of a unique electronic identifier and a temperature value from a temperature-enabled RFID tag, the robotic system can: query the lookup table for a known location (e.g., latitude, longitude, and height in the coordinate system of the store) of a tagged assigned this unique electronic identifier; and then tag a temperature value—received with this unique electronic identifier—with this location. Alternatively, the robotic system can upload unique electronic identifier and temperature value pairs—recorded during the scan routine—to the remote computer system, and the remote computer system can associate these temperature values with physical locations in the store (and the enclosed cooling unit more specifically) based on stored locations of these unique electronic identifiers.

In this implementation, locations of RFID tags can be entered manually, such as into a planogram of the store by a store associate or by an operator affiliated with the robotic system. Alternatively, during scan routines executed by the robotic system over time, the robotic system can: collect unique electronic identifier and temperature value pairs from these RFID tags; derive locations of these RFID tags as described above; and combine RFID tag location derived over multiple scan routines into a final verified location of these RFID tags. The robotic system (or the remote computer system) can then store these final RFID tag locations in a lookup table and transition to linking temperature values received from these RFID tags to physical locations in the store based on RFID tag locations stored in this lookup table.

10.3 Temperature Mapping

In Block S142, the remote computer system can then map the set of temperatures received from these RFID tags to the set of products—detected in the color image in Block S140 as described above—based on: locations of the set of RFID tags in the enclosed cooling unit; and locations of the set of products identified in the color image. In particular, the robotic system and/or the remote computer system can link temperature values received from RFID tags throughout the store by the robotic system during the scan routine: to physical locations throughout the store; or to positions within temperature-controlled units at known locations through the store more specifically. The remote computer system can then compile these georeferenced temperature data to generate a map or other representation of temperatures throughout these temperature-controlled units and thus derive more specific temperatures of shelves, slots, or individual products stocked in these temperature-controlled units.

In one implementation, the remote computer system: generates a realogram or other spatial map of products identified in the color image of the temperature-controlled unit; projects georeferenced temperatures received from RFID tags in the temperature-controlled unit onto this realogram or other spatial map of products; associates each product with the nearest georeferenced temperature in Block S142; and records temperature value and product identifier (e.g., SKU) pairs for these products and with a time of the scan routine in Block S110. For example, the remote computer system can: calculate a temperature gradient across the enclosed cooling unit by interpolating between the set of temperature values based on known or detected locations of corresponding RFID tags in the enclosed cooling unit; project boundaries of the set of products—identified in the color image—onto the temperature gradient; and, for each product in this set of products, extract a temperature of the product from a region of the temperature gradient contained within the boundary of the product thus projected onto the temperature gradient. Therefore, in this example, the remote computer system can map a temperature value received from a temperature-enabled RFID to a subset of products—in a set of products detected in the color image of the temperature-controlled unit—proximal the known or detected location of the temperature-enabled RFID tag.

Similarly, the remote computer system can: project georeferenced temperatures received from RFID tags in the temperature-controlled unit onto a planogram or slot map of the temperature-controlled unit; associate each slot in the temperature-controlled unit with the nearest georeferenced temperature (e.g., the temperature received an RFID tag located in a nearest or store location in the temperature-controlled unit) in Block S142; and record temperature value and slot address pairs for the temperature-controlled unit and with the time of the scan routine in Block S110. The remote computer system can additionally or alternatively record temperature value and shelf address pairs for the temperature-controlled unit and with the time of the scan routine in Block S110.

Alternatively, the robotic system can interpolate between temperatures received from RFID tags in the temperature-controlled unit and/or extrapolate temperatures beyond these RFID tags and estimate temperatures of products, slots, and/or shelves in the temperature-controlled unit accordingly. In one implementation, the remote computer system: receives a color image of an enclosed cooling unit and electronic identifiers and temperature value pairs recorded by the robotic system at a first time during a scan routine; links these temperature values to discrete locations within the enclosed cooling unit in the store based on corresponding electronic identifiers, as described above; and calculates a temperature gradient across the enclosed cooling unit at the first time by interpolating between these temperature values based on known or detected locations of their corresponding RFID tags, as shown in FIG. 3. In this implementation, the remote computer system also: detects products in the color image in Block S140; generates a realogram or other spatial map of these products in the enclosed cooling unit; projects the temperature gradient onto the realogram or other spatial product map (e.g., based on known or detected locations of the RFID tags in the enclosed cooling unit) (or vice versa); extracts an average temperature, peak temperature, minimum temperature, and/or spatial temperature variance, etc. of each product depicted in this realogram or other spatial product map; and records these temperature value and product identifier pairs with the time of the scan routine in Block S110. In this implementation, the remote computer system can additionally or alternatively: project the temperature gradient onto a slot map of the enclosed cooling unit (e.g., based on known or detected locations of the RFID tags in the enclosed cooling unit) (or vice versa); extract an average temperature, peak temperature, minimum temperature, and/or spatial temperature variance, etc. of each slot represented in the slot map; and record these temperature value and slot address pairs with the time of the scan routine in Block S110. The remote computer system can additionally or alternatively: calculate average temperature, peak temperature, minimum temperature, and/or spatial temperature variance, etc. of each shelf in the enclosed cooling unit; and record temperature value and shelf address pairs for the enclosed cooling unit with the time of the scan routine in Block S110. Similarly, the remote computer system can: calculate an average temperature, peak temperature, minimum temperature, and/or spatial temperature variance, etc. of the enclosed cooling unit as a whole or of discrete reference surfaces at known locations within the enclosed cooling unit; and record these temperature values with an identifier or address of the enclosed cooling unit and the time of the scan routine in Block S110.

10.4 Store-Wide Temperature Map

In another implementation, the remote computer system: populates a 3D temperature map of the store with points representing locations of each temperature-enabled RFID tag in the store; labels each point with the temperature value received from the corresponding temperature-enabled RFID tag by the robotic system during the last scan routine; inserts boundaries of discrete cooling units into the temperature map, such as by projecting a floor plan of the store—including perimeters of these cooling units—or a planogram of the store onto a ground plane in the temperature map; and then defines discrete groups of points contained within the bounds of each cooling unit or within the bounds of a row of adjacent cooling units (e.g., a row of open or closed cooling units spanning one side of one aisle) in the store. For a group of points thus bounded by a single cooling unit, the remote computer system can interpolate temperatures in the cooling unit between points in this group and extrapolate temperatures from these points to the 2D or 3D boundary of the cooling unit. Therefore, in this example, the remote computer system can calculate a temperature gradient or temperature lines extending across a vertical plane spanning an opening (e.g., a door, a window) of the cooling unit (or row of cooling units).

The remote computer system can then overlay this temperature gradient onto a realogram of the cooling unit (or row of adjacent cooling units) to determine temperatures of products detected in this cooling unit. The remote computer system can repeat this process for each other group of points corresponding to other cooling units throughout the store to determine temperatures of products detected in these other cooling units.

Alternatively, once the remote computer system has inserted temperature-labeled points into the temperature map of the store, the remote computer system can: access a planogram of the store; project a set of slot points—representing locations of slots in cooling units throughout the store—into the temperature map; and define discrete groups of temperature-labeled points corresponding to discrete cooling units (or connected rows of adjacent cooling units) throughout the store, as described above. For each cooling unit (or row of adjacent cooling units), the remote computer system can then interpolate or extrapolate a temperature at each slot point—representing a slot in the cooling unit—according to values of temperature-labeled points in the corresponding group, thereby generating a map of temperatures at each product slot (e.g., at the vertical and horizontal center of a foremost face of the product slot) in the cooling unit. The remote computer system can repeat this process for each other cooling unit or row of adjacent cooling units throughout the store to generate maps of temperatures at product slots in these other cooling units.

In a similar implementation, once the system transforms color images of cooling units recorded by the robotic system during the scan routine into realograms of types and positions of products on these cooling units throughout the store, as described above, the system can: project temperature-labeled points into these realograms according to known locations of corresponding temperature-enabled RFID tags and known locations of cooling units in the store; calculate centers of each product facing represented in these cooling unit realograms; and then interpolate or extrapolate a temperature at each product center from these temperature-labeled points, as described above.

However, the system can implement any other method or technique to transform discrete temperature values received from temperature-enabled RFID tags coupled to cooling units throughout the store into a temperature map of the store, into temperatures of discrete product slots in these cooling units, or into temperatures of discrete products stocked in these cooling units.

11. Temperature Errors

In one variation shown in FIG. 1, the remote computer system also checks that product and/or temperature-controlled unit temperatures meet predefined temperature requirements for these products or cooling units.

11.1 Absolute Cooling Unit Temperature Errors

In one implementation, for each cooling unit, the remote computer system retrieves a target temperature or target temperature range for the temperature-controlled unit from a database, such as from a lookup table, and selectively prompts inspection of the temperature-controlled unit responsive to a measured temperature of the temperature-controlled unit deviating from this target temperature or target temperature range. In one example, the remote computer system can calculate a mean temperature of a temperature-controlled unit during the last scan routine, such as by: averaging a set of temperatures received from RFID tags in the temperature-controlled unit; averaging temperatures of each product in the temperature-controlled unit derived from a thermal image; or averaging or combining temperatures across a temperature gradient calculated by the remote computer system. The remote computer system can also access a current temperature setting of the cooling unit, such as by: reading a temperature from a temperature setting readout on the temperature-controlled unit depicted in the concurrent color image of the temperature-controlled unit; or reading a temperature setting assigned to the cooling unit by the planogram of the store. Then, in response to this mean temperature of the temperature-controlled unit deviating from the current temperature setting by more than a threshold difference (e.g., 2° C.), the remote controller can serve a maintenance prompt to inspect the temperature-controlled unit to a computing device affiliated with an associate of the store. For example, the remote computer system can: serve this prompt to a store associates smartphone or tablet in real-time upon detecting this temperature deviation (e.g., if this temperature deviation is large); or append a global restocking list for the store with this prompt (e.g., if this temperature deviation is small) and later serve this global restocking list for the store to store associates during a schedule restocking period (e.g., between 10 PM and 12 AM daily).

Alternatively, in response to this mean temperature of the temperature-controlled unit deviating from the current temperature setting by more than a threshold difference (e.g., 2° C.), the remote controller can: trigger the remote computer system to rescan the temperature-controlled unit, such as one hour later; repeat the foregoing processes to derive a second mean temperature of the temperature-controlled unit; and then serve this prompt to the store associate to inspect the temperature-controlled unit if the second mean temperature of the temperature-controlled unit still deviates from the current temperature setting by more than the threshold difference.

In a similar example, the remote computer system can derive a representative temperature of a temperature-controlled unit, such as: a mean temperature within a temperature gradient of a vertical plane of the temperature-controlled unit; a temperature of a reference surface in the temperature-controlled unit; or an average temperature of all detected products in the temperature-controlled unit. The remote computer system can then issue a prompt or notification to inspect a temperature-controlled unit and either adjust a temperature setting on the temperature-controlled unit or schedule maintenance of the representative temperature of the temperature-controlled unit exceeds the target temperature or a target temperature range assigned to temperature-controlled unit by a threshold maintenance difference (e.g., 2° F.). However, if the representative temperature of the temperature-controlled unit exceeds the target temperature or target temperature range assigned to the temperature-controlled unit by a threshold failure difference (e.g., 5° F.), the remote computer system can serve a prompt to a store associate (e.g., a store manager) to immediately transfer product out of the temperature-controlled unit and into another temperature-controlled unit before these products spoil or are otherwise overexposed to heat overage (e.g., for refrigerated or frozen goods in a cooling unit) or heat scarcity (e.g., for hot goods in a heated display).

Furthermore, if only one product or a small proportion of products in a non-linear (e.g., "random") arrangement of slots in the cooling unit are detected at temperatures above the target temperature range of the cooling unit, the remote computer system can determine that these products are exhibiting elevated temperatures: as a result of being recently stocked in the cooling unit; or as a result of being removed from the cooling unit and then recently being returned to the cooling unit. The remote computer system can therefore avoid flagging the cooling unit as malfunctioning when only a small proportion of products detected in the cooling unit exhibit elevated temperatures.

However, in this implementation, the remote computer system can automatically submit a request for maintenance of a temperature-controlled unit if a temperature-controlled unit deviates from assigned target temperature or target temperature range in any other way.

10.2 Cooling Unit Temperature Variance Errors

In another implementation, the remote computer system selectively prompts store associates to inspect, repair, or replace a temperature-controlled unit based on a spatial and/or temporal temperature variance.

In one example, the remote computer system: implements methods and techniques described above to calculate a temperature gradient across a vertical plane of a temperature-controlled unit based on a thermal image of the temperature-controlled unit or based on temperature values received from temperature-enabled wireless transmitters arranged in the temperature-controlled unit. The remote computer system then calculates a spatial temperature variance across this plane of the temperature-controlled unit based on the temperature gradient, such as by: filtering the temperature gradient to reduce noise; extracting minimum and maximum temperatures from the filtered temperature gradient; and calculating a temperature difference between the minimum and maximum temperatures. Because a spatial temperature variance may indicate failure of a fan, a door ajar, or other failure in a temperature-controlled unit, the remote computer system can serve a maintenance prompt to inspect the cooling unit to a computing device affiliated with an associate of the store if the spatial temperature variance of the temperature-controlled unit exceeds a threshold variance (e.g., 3° C.).

In this example, the remote computer system can prompt a store associate to check a cooling unit with a row of doors for a door ajar condition if the spatial temperature variance occurs laterally across the temperature gradient of the cooling unit. Alternatively, the remote computer system can prompt a store associate to inspect a fan in the cooling unit for failure or intermittent operation if the spatial temperature variance occurs vertically in the temperature gradient of the cooling unit.

Alternatively, in the foregoing example, in response to the temperature variance of a temperature-controlled unit exceeding a threshold variance, the remote controller can: trigger the remote computer system to rescan the temperature-controlled unit, such as one hour later; repeat the foregoing processes to derive a second temperature variance of the temperature-controlled unit; and then serve a prompt to the store associate to inspect the temperature-controlled unit if the second temperature variance of the temperature-controlled unit still exceeds the threshold variance.

10.3 Absolute Product Temperature Error

In a similar implementation, upon detecting a unit of a product in an image of a cooling unit, the system can retrieve a target temperature or target temperature range assigned to the product. If the received or calculated temperature of the unit of the product exceeds the target temperature or target temperature range, the system can flag a slot in the cooling unit containing the unit of the product and selectively serve notifications related to the slot and/or to the unit of the product specifically to associates of the store. For example, if the temperature of the product exceeds a maximum threshold temperature (e.g., 75° F. for dairy products) at any time, the system can serve a notification—to associates of the store—including: an address of the slot; a prompt to remove the product from the slot and to discard the product; and a prompt to check products behind and around this product for temperature variations (e.g., with a handheld infrared thermometer).

In a similar implementation, the remote computer system can: identify a product in a color image of a temperature-controlled unit recorded by the robotic system during a scan routine; extract or derive a temperature of the product based on temperature-related data collected by the robotic system during this scan routine; and store this temperature of the product, such as with the time of this scan routine and a slot address occupied by the product, in a store record. The remote computer system can also: access a temperature requirement of the product; verify that the temperature of the product—during this scan routine—falls within a temperature range specified for the product in the temperature requirement; and flag the product in the store record if the temperature of the product falls outside of this temperature range. Furthermore, if the temperature of the product falls outside of the temperature range, the robotic system can: initialize an electronic notification; identify the product in the electronic notification; identify the temperature-controlled unit and a slot address of the product in the electronic notification; write a prompt to remove (and discard) the product from the temperature-controlled unit to the electronic notification; and then serve the electronic notification to an associate of the store, such as to the associate's smartphone or tablet in real-time. Alternatively, the robotic system can append a prompt—to remove the product from the temperature-controlled unit—to a next global restocking list for the store.

10.4 Accumulated Product Temperature Error

In one variation in which the robotic system is regularly scanning temperature-controlled units and cooling units throughout the store, the system can implement the foregoing methods and techniques to derive temperatures of cooling units and products stocked in these cooling units during each scan routine. In this variation, the system can flag a particular product in a cooling unit if the temperature of this product—derived from data recorded during a first scan routine—exceeds a target temperature or target temperature range assigned to this product. If the temperature of this product—derived from data recorded during a subsequent scan routine (e.g., thirty minutes later)—is less than the target temperature or falls within the target temperature range, the system can clear this flag for the product. However, if the temperature of the product—derived from data recorded during the second scan routine—still exceeds the target temperature or target temperature range, the system can immediately serve a prompt to an associate of the store to remove the product from the cooling unit due to possible over-temperature exposure or serve a prompt to an associate of the store to inspect the cooling unit (e.g., if products in several adjacent slots similarly exhibit over-temperatures), as described above.

Alternatively, as the robotic system executes additional scan routines and the system derives additional temperatures of the product from data recorded by the robotic system during these scan routines, the system can integrate temperatures of the product—exceeding target temperatures or temperature ranges assigned to the product—over time and thus estimate temperature exposure (or "over-temperature") of the product (or products in the corresponding slot more generally). When the temperature exposure of the product (or products in the slot more generally) exceeds a threshold exposure, the system can then serve a prompt to an associate of the store to remove and replace the product, remove and replace all products in the corresponding slot, and/or inspect the cooling unit, etc.

In a similar implementation, the remote computer system can: repeat the foregoing processes to detect or derive temperatures of products in a temperature-controlled unit from temperature-related data recorded by the robotic system over a series of scan routines within the store; aggregate timestamped temperatures of these products; and estimate temperature exposures of these products by integrating these timestamped temperatures over time. For example, the remote computer system can estimate temperature exposures of products—in a set of products detected in color images of a temperature-controlled unit—between a first time and a second time by integrating between: a first set of temperatures of the set of products derived from temperature-related data recorded during a first scan routine at a first time; and a second set of temperatures of the set of products derived from temperature-related data recorded during a second scan routine at a second time; based on a time duration between the first time and the second time.

In the foregoing implementation, the remote computer system can also: access a shelf life model of a particular product in this set of products detected in a last color image of a temperature-controlled unit; estimate a temperature exposure of the particular product—such as in the form of a degree-Celsius-hour value—as described above; and estimate a remaining shelf life of the particular product based on the shelf life model and the temperature exposure of the particular product. For example, the remote computer system can access a shelf life model that specifies a total permitted temperature exposure of a product, such as in the form of: a fixed degree-Celsius-hour value (e.g., 140 degree-Celsius-hours for raw meats); or a parametric model. In this example, a parametric shelf life model can define: a long total storage time for a product if frozen (e.g., weeks for a meat product); a medium-duration time trigger for product sale once its temperature exceeds a low temperature threshold (e.g., two days if the temperature exceeds 1° C. for the meat product); a short-duration time trigger for product sale once its temperature exceeds a medium temperature threshold (e.g., four hours if the temperature exceeds 4° C. for the meat product); and a discard trigger for the product once its temperature exceeds a high temperature threshold (e.g., if the temperature exceeds 10° C.).

The remote computer system can thus compare the temperature exposure of the particular product to the shelf life model to estimate a remaining shelf life of the particular product, such as in the form of remaining permitted degree-Celsius-hour exposure. For example, the remote computer system can calculate a remaining permitted degree-Celsius-hour exposure for the particular product and then multiply this value by a last detected or derived temperature of the product in order to estimate a remaining shelf life (e.g., in hours) of the particular product. Then, if this estimated remaining shelf life of the particular product falls below a threshold duration (e.g., four hours for a meat product; one day for a dairy product), the remote computer system can: generate an electronic notification identifying the particular product, the address of the slot occupied by the particular product in the temperature-controlled unit, and the remaining shelf life (e.g., in hours) of the particular product; and then serve the electronic notification to a computing device affiliated with an associate of the store, such as in real-time. Alternatively, the remote computer system can note this remaining shelf life of the particular product in the global restocking list for the store. The remote computer system can similarly serve a prompt to the store associate to discard the particular product—such as in real-time—if the remaining shelf life of the particular product thus calculated is null.

However, the remote computer system can detect and handle temperature deviations of temperature-controlled units, product slots, or specific products in these temperature-controlled units in any other way and according to any other schema.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for monitoring temperature-controlled inventory within a store, the method comprising:
   at a robotic system, during a first scan cycle:
     autonomously navigating toward a temperature-controlled unit in the store;
     recording a photographic image and a thermal image of the temperature-controlled unit; and
     identifying a set of products stocked in the temperature-controlled unit based on features detected in the photographic image;
   for each product in the set of products:
     retrieving an emissivity of a surface of the product based on an identity of the product;
     selecting a thermal pixel, in the thermal image, depicting the product; and calculating a temperature of the product during the scan cycle based on the emissivity of the surface of the product and a thermal value stored in the thermal pixel; and generating a record of temperatures of the set of products stocked in the temperature-controlled unit during the first scan cycle.

2. The method of claim 1:

further comprising, during the first scan cycle, recording a depth image of the temperature-controlled unit; and wherein calculating the temperature of each product in the set of products during the first scan cycle comprises, for each product in the set of products:
 calculating a distance from the robotic system to the product based on the depth image; and
 calculating the temperature of the product during the scan cycle further based on the distance from the robotic system to the product.

3. The method of claim 1:

further comprising, during the first scan cycle, recording an ambient temperature, an ambient humidity, and an ambient light level proximal the temperature-controlled unit; and wherein calculating the temperature of each product in the set of products during the first scan cycle comprises, for each product in the set of products, passing the emissivity of the surface of the product, the thermal value stored in the thermal pixel, the ambient temperature, the ambient humidity, and the ambient light level into a physics model to calculate the temperature of the product during the scan cycle.

4. The method of claim 1:

wherein recording the photographic image and the thermal image of the temperature-controlled unit comprises recording the photographic image and the thermal image of the temperature-controlled unit comprising an open temperature-controlled unit in the store; and further comprising:
 at the robotic system, during the first scan cycle:
  autonomously navigating toward an enclosed temperature-controlled unit in the store;
  recording a second photographic image of the enclosed temperature-controlled unit; and
  recording a set of temperature values wirelessly transmitted by a set of temperature-enabled transmitters coupled to the enclosed temperature-controlled unit;
 identifying a second set of products stocked in the enclosed temperature-controlled unit based on features detected in the second photographic image;
 accessing locations of the set of temperature-enabled transmitters coupled to the enclosed temperature-controlled unit;
 mapping the set of temperature values received from the set of temperature-enabled transmitters to the second set of products during the first scan cycle based on:
  locations of the set of temperature-enabled transmitters coupled to the enclosed temperature-controlled unit; and
  locations of the set of products identified in the second photographic image; and
 generating a second record of temperatures of the second set of products stocked in the enclosed temperature-controlled unit during the first scan cycle.

5. The method of claim 1, further comprising:

deriving a temperature gradient from the thermal image;

calculating a spatial temperature variance across the temperature-controlled unit from the temperature gradient; and in response to the spatial temperature variance across the temperature-controlled unit exceeding a threshold variance, serving a maintenance prompt to inspect the temperature-controlled unit to a computing device affiliated with an associate of the store.

6. The method of claim 1, further comprising:

accessing a temperature specification of a first product in the set of products;

based on the record of temperatures of the set of products, detecting deviation of a first temperature of the first product during the first scan cycle from the temperature specification of the first product; and in response to detecting deviation of the first temperature of the first product from the temperature specification:
 generating an electronic notification comprising a prompt to remove the first product from the temperature-controlled unit; and
 serving the electronic notification to a computing device affiliated with an associate of the store.

7. The method of claim 1, wherein identifying the set of products stocked in the temperature-controlled unit comprises:

accessing a first list of products assigned to the temperature-controlled unit;

retrieving a first set of template images from a database of template images, each template image in the first set of template images representing visual features of a product in the first list of products;

detecting a first object in a first region of the photographic image;

extracting a first set of features from the first region of the photographic image; and identifying the first object as a unit of a first product, in the set of products, based on correspondence between the first set of features and template features in a first template image, in the first set of template images, representing the first product.

8. A method for monitoring temperature-controlled inventory within a store, the method comprising:

at a robotic system, during a first scan cycle:
 autonomously navigating toward a temperature-controlled unit in the store;
 recording a photographic image of the temperature-controlled unit; and
 recording a set of temperature values measured by a set of temperature sensors coupled to the temperature-controlled unit;

identifying a set of products stocked in the temperature-controlled unit based on features detected in the photographic image;

for each product in the set of products:
 detecting a location of the product stocked in the temperature-controlled unit based on a position of the product detected in the photographic image; and
 estimating a temperature of the product based on:
  the location of the product stocked in the temperature-controlled unit;
  the set of temperature values; and
  locations of the set of temperature sensors coupled to the temperature-controlled unit; and generating a record of temperatures of the set of products stocked in the temperature-controlled unit during the first scan cycle.

9. The method of claim 8, wherein estimating the temperature of the product for each product in the set of products comprises:
calculating a temperature gradient across the temperature-controlled unit by interpolating temperatures between the set of temperature values based on locations of corresponding temperature sensors, in the set of temperature sensors, in the temperature-controlled unit; and
for each product in the set of products:
projecting a boundary of product, identified in the photographic image, onto the temperature gradient; and
extracting a temperature of the product from a region of the temperature gradient contained within the boundary of the product projected onto the temperature gradient.

10. The method of claim 8, further comprising:
identifying the temperature-controlled unit; and
accessing locations of the set of temperature sensors, relative to the temperature-controlled unit, from a database of temperature sensor locations in the store based on an identity of the temperature-controlled unit.

11. The method of claim 8:
further comprising, at the robotic system during the first scan cycle, broadcasting a query for temperature values from the set of temperature sensors coupled to the temperature-controlled unit; and
wherein recording the set of temperature values comprises recording the set of temperature values wirelessly transmitted by the set of temperature sensors responsive to the query.

12. The method of claim 8:
wherein recording the set of temperature values comprises recording a set of images of the temperature-controlled unit, the set of images:
depicting a set of temperature displays coupled to the set of temperature sensors; and
comprising the photographic image; and
further comprising:
detecting the set of temperature displays in the set of images; and
extracting the set of temperature values from regions in the set of images depicting the set of temperature displays.

13. The method of claim 12:
wherein detecting the set of temperature displays in the set of images comprises
detecting a set of optical fiducials in the set of images; and
identifying the set of temperature displays in the set of images based on the set of optical fiducials; and
further comprising extracting locations of the set of temperature sensors, relative to the temperature-controlled unit, from the set of images based on locations of the set of optical fiducials detected in the set of images.

14. A method for monitoring temperature-controlled inventory within a store, the method comprising:
accessing a photographic image of a temperature-controlled unit within the store, the photographic image captured at a first time; and
accessing a set of temperatures within the temperature-controlled unit at approximately the first time;
identifying a set of products stocked in the temperature-controlled unit at the first time based on features detected in the photographic image;
mapping the set of temperatures to the set of products based on positions of products, in the set of products, identified in the photographic image; and
generating a record of temperatures of the set of products stocked in the temperature-controlled unit at the first time.

15. The method of claim 14:
wherein accessing the set of temperatures within the temperature-controlled unit comprises accessing the set of temperatures returned by a set of temperature sensors within the temperature-controlled unit at approximately the first time;
further comprising:
calculating a temperature gradient across the enclosed temperature-controlled unit by interpolating between the set of temperature values based on locations of corresponding temperature sensors, in the set of temperature sensors, in the enclosed temperature-controlled unit;
calculating a spatial temperature variance in the temperature gradient across the enclosed temperature-controlled unit at the first time; and
in response to the spatial temperature variance of the temperature-controlled unit exceeding a threshold variance, serving a maintenance prompt to inspect the temperature-controlled unit to a computing device affiliated with an associate of the store.

16. The method of claim 14:
wherein accessing the set of temperatures within the temperature-controlled unit comprises accessing a thermal image of the temperature-controlled unit captured at approximately the first time, the thermal image representing temperatures across the temperature-controlled unit; and
wherein mapping the set of temperatures to the set of products comprises, for each product in the set of products:
retrieving an emissivity of a surface of the product based on an identity of the product;
selecting a thermal pixel, in the thermal image, depicting the product; and
calculating a temperature of the product during the scan cycle based on the emissivity of the surface of the product and a thermal value stored in the thermal pixel.

17. The method of claim 16, further comprising:
dispatching a robotic system to execute a first scan cycle in the store; and
at the robotic system, during the first scan cycle:
autonomously navigating toward the temperature-controlled unit;
recording the photographic image of the temperature-controlled unit at the first time; and
recording the thermal image of the temperature-controlled unit at approximately the first time.

18. The method of claim 14, further comprising:
dispatching a robotic system to execute a first scan cycle in the store; and
at the robotic system, during the first scan cycle:
autonomously navigating toward the temperature-controlled unit;
recording the photographic image of the temperature-controlled unit at the first time;
broadcasting a query to a set of temperature-enabled transmitters arranged in the temperature-controlled unit; and recording the set of temperature values, within the temperature-controlled unit, received from the set of temperature-enabled transmitters at approximately the first time.

19. The method of claim 14, further comprising:

calculating a mean temperature of the temperature-controlled unit at the first time based on the set of temperatures within the temperature-controlled unit;

accessing a temperature setting of the temperature-controlled unit at the first time; and in response to the mean temperature of the temperature-controlled unit deviating from the temperature setting at the first time by more than a threshold difference, serving a maintenance prompt to inspect the temperature-controlled unit to a computing device affiliated with an associate of the store.

20. The method of claim 14, further comprising:

accessing a second photographic image of the temperature-controlled unit at a second time succeeding the first time;

accessing a second set of temperatures within the temperature-controlled unit at approximately the second time;

identifying the set of products stocked in the temperature-controlled unit at the second time based on features detected in the second photographic image;

mapping the second set of temperatures to the set of products based on positions of products, in the set of products, identified in the second photographic image; and estimating temperature exposures of products, in the set of products, between the first time and the second time by integrating from the first set of temperatures to the second set of temperatures of the set of products over a time duration from approximately the first time to approximately the second time.

21. The method of claim 20, further comprising:

accessing a shelf life model of a first product in the set of products;

estimating a remaining shelf life of the first product based on the shelf life model and a first temperature exposure of the first product; and in response to the remaining shelf life of the first product falling below a threshold duration:

generating an electronic notification identifying the first product and the remaining shelf life of the first product; and serving the electronic notification to a computing device affiliated with an associate of the store.

* * * * *